United States Patent [19]

Wnuck et al.

[11] Patent Number: 4,654,195

[45] Date of Patent: Mar. 31, 1987

[54] METHOD FOR FABRICATING MOLTEN CARBONATE RIBBED ANODES

[75] Inventors: Wayne G. Wnuck, Stafford Springs, Conn.; Bryan J. Dec, Chicopee, Mass.; Raymond J. Jarvis, South Windsor, Conn.

[73] Assignee: International Fuel Cells Corporation, South Windsor, Conn.

[21] Appl. No.: 812,213

[22] Filed: Dec. 23, 1985

[51] Int. Cl.$^4$ .............................................. B22F 7/04
[52] U.S. Cl. ........................................ 419/2; 264/104; 264/125; 419/54; 419/55; 419/58; 429/46
[58] Field of Search .................. 419/2, 58, 54, 55; 264/125, 104; 429/46

[56] References Cited

U.S. PATENT DOCUMENTS

| | | | |
|---|---|---|---|
| 2,260,247 | 10/1941 | Darby et al. | 29/149.5 |
| 3,158,510 | 11/1964 | Talvenheimo | 136/122 |
| 4,115,627 | 9/1978 | Christner et al. | 429/44 |
| 4,165,349 | 8/1979 | Sandelli | 264/129 |
| 4,239,557 | 12/1980 | Thellmann et al. | 148/126 |
| 4,386,040 | 5/1983 | Baumgartner et al. | 419/23 |
| 4,537,743 | 8/1985 | Yamanaka et al. | 419/38 |

*Primary Examiner*—Stephen J. Lechert, Jr.
*Attorney, Agent, or Firm*—A. Dean Olson

[57] ABSTRACT

A method for fabricating ribbed electrodes that accommodates the shrinkage which occurs during thermal cycling reducing the cracks caused by the confining stresses of a mold. A composition comprising a metal selected from the group consisting of nickel, copper and mixtures thereof with chromium onto a ribbed mold. The mold and composition are prefired in a reducing atmosphere forming a ribbed electrode. The ribbed electrode is removed from the mold and sintered in a reducing atmosphere.

4 Claims, No Drawings

METHOD FOR FABRICATING MOLTEN CARBONATE RIBBED ANODES

DESCRIPTION

1. Technical Field

This disclosure relates to methods for fabricating electrodes, particularly molten carbonate fuel cell ribbed anodes.

2. Background Art

Molten carbonate fuel cells generally comprise two electrodes with their current collectors, a cathode and an anode, an electrolyte tile making contact with both the electrodes and a cell housing to physically retain the cell components. Under fuel cell operating conditions, in the range of about 500 degrees centigrade (°C.) to about 700° C., the entire electrolyte tile, the carbonate and the inert support material, forms a paste and thus the electrolyte diaphragms of this type are known as paste electrolytes. The electrolyte is in direct contact with the electrodes where the three phase reactions (gas-electrolyte-electrode) take place. Hydrogen is consumed in the anode area producing water, carbon dioxide and electrons. The electrons flow to the cathode through an external circuit producing the desired current flow. At the anode there must be ready entry for the reactant gas, ready exit for the chemical reaction products and ready exit for the product electrons. To maintain a high level of stable performance, both electrolyte and electrode design and properties must be optimized and stabilized at the gas-electrolyte-electrode interface.

Porous electrodes, for example, anodes of cobalt or nickel have been previously used in molten carbonate fuel cells. Porous anodes of this type can be produced by a variety of powder metallurgical techniques to form a green compact with voids between the particles forming interconnected pore channels throughout the compact. The green compact is then sintered by heating at temperatures of greater than about 70 percent of the melting point temperature. This produces anodes having pore channels throughout the structure. The loss of fuel cell power output of molten carbonate fuel cells after as short as a few hundred hours of use has been noted with porous cobalt and nickel anodes. The molten carbonate fuel cell power output loss appears to be related to the surface area loss of the porous anode. Thus, "stability" as referred to in this disclosure relates to maintenance of fuel cell power output and anode surface area.

Various methods have been attempted to increase the porosity of electrode materials. One method has been to incorporate in the electrode material an alkali soluble material such as aluminum, silicon or boron which is dissolved out of the primary electrode material as taught by U.S. Pat. Nos. 3,359,099 and 3,414,438. However, such Raney-type electrodes produced according to these patents, while they have had greater initial porosity, have the same long term instability under molten carbonate fuel cell operation as normally produced porous nickel or cobalt anodes. In U.S. Pat. No. 4,247,604, molten alkali metal carbonate fuel cell porous anodes are described which have a stabilizing agent such as lithium salts. Lithiated nickel oxide electrodes for use in high temperature gas combustion fuel cells and methods for making the same are also described in U.S. Pat. No. 2,914,596. Finally, U.S. Pat. No. 4,239,557 describes chromium containing stable electrodes and methods of making the same.

Other approaches to producing high surface area electrodes for molten carbonate fuel cells include electrodes having metal fiber wicks as described in U.S. Pat. No. 3,826,686 and the electrodes and methods of making the same described in U.S. Pat. No. 3,158,510. Although there are a variety of electrodes and methods of making them in the prior art, it is important to have electrodes that perform well and have the high strength which helps provide a fuel cell with a long life.

Accordingly, there is a constant search in this art for high strength electrodes and methods of making the same so that the long life fuel cell necessary for successful commercial operation can be achieved.

SUMMARY OF THE INVENTION

This disclosure is directed to a method of making high strength ribbed electrodes. Ribbed electrodes are fabricated by depositing a composition comprising a metal selected from the group consisting of nickel, copper and mixtures thereof with chromium onto a ribbed mold. The mold and composition are prefired in a reducing atmosphere forming a ribbed electrode. The ribbed electrode is removed from the mold and sintered in a reducing atmosphere.

This method of fabrication accommodates the shrinkage which can occur during thermal processing and thus reduces the cracks caused by the confining stresses of a mold. Thus, it provides a significant advance to the fuel cell industry.

The foregoing and other objects, features and advantages will be apparent from the specification and claims which will illustrate an embodiment of the invention.

BEST MODE FOR CARRYING OUT THE INVENTION

Elemental nickel or copper powders are used as a major component in these processes. It is preferred to use nickel because of its reduced tendency to sinter at cell operating conditions as a result of its higher melting point. These powders are preferably about 1 micron ($\mu$) to about 5 $\mu$ in diameter because these sizes produce the desired pore size distribution. It is especially preferred to use filamentary nickel such as is made by the thermal decomposition of nickel carbonyl because these powders can be readily sintered into plaques of high strength and porosity with a desirable pore size distribution for high electrochemical performance. No. 287 filamentary nickel which is available from International Nickel, New York, New York is an exemplary material. It is preferred that about 95 percent by weight (%) to about 99.5% of the major component of these ribbed electrodes is elemental nickel powder.

The above powders are mixed with a stabilizer, preferably chromium. It is preferred to use chromium because it can be readily alloyed with nickel at typical sintering conditions (e.g. >1050° C. in a reducing environment). Alloying is desirable as it stabilizes the anode. In addition, alloying provides a good dispersion of the chromium, which upon optional subsequent oxidation, results in excellent resistance to compressive creep. These powders are preferably about $1\mu$ to about $5\mu$ in size because it is desirable to use nickel and chromium particles of similar size to promote good mixing. An exemplary material is G-306 chromium available from Gallard Schlesinger, Carle Place, New York. These compounds act as stabilizers for the electrode material and it is preferred that they are present in an amount about 0.5% to about 5%. Below about 0.5% the stabilizer is not present in sufficient amounts to alloy the nickel so that it is stabilized from further sintering during conventional cell operation temperatures (e.g. 600° C. to about 700° C.). When the stabilizer is present in amounts greater than about 5%, contact with the lithium carbonate normally present in the cell during operation can result in an undesirable effect. For example, the lithium carbonate may convert chromium to lithium chromite. When this compound is formed in large quantities, it can break apart the electrode.

The process of this invention encompasses mixing the above powders together and depositing (laying) them onto a ribbed template (mold). It is preferable to sift the powders onto the ribbed mold as this provides a higher porosity which is typically desired to achieve the desired pore size distribution. The powders can also be compacted onto the mold, however, this results in less porosity which may not be desired as explained above. A ribbed mold refers to a conventional ribbed mold used for the fabrication of ribbed electrodes. During molding the ribs impart gas passage channels to the electrode. In a more general sense, ribbed refers to grooves, channels or any indentation which is desired to be imprinted or molded into an electrode. Typically, after depositing the powder, the side of the electrode which is not in contact with the mold is smoothed so that its thickness prior to heating is about 2.5 millimeters (mm) to about 4 mm. However, the thickness of the electrode will vary depending upon the size of the fuel cell desired.

The mold and powders are then prefired at a temperature of about 650° C. to about 900° C. in a reducing atmosphere. The reducing atmosphere assures that the powders described above are not oxidized when exposed to high temperatures. Thus, typically a 10% hydrogen and 90% nitrogen atmosphere is adequate. Surprisingly, it has been discovered that the high temperatures (for example, greater than about 1050° C. required to alloy a chrome/nickel combination) produces faults when a ribbed substrate is molded. The high temperatures cause shrinking of the molded powders (about 25% to about 30% linear shrinkage in each direction) and as the electrode shrinks, the confining stresses of the mold produce imperfections. These imperfections can range from indentations to broken electrodes resulting in low strength electrodes. The low temperature prefiring step serves to hold the powders together yet does not result in significant length or width shrinkage (but about 20% to about 25% in thickness). Thus, below about 650° C., a temperature high enough to sinter the powder together for handling purposes is not achieved. Above about 900° C., excessive shrinkage occurs resulting in the stresses and cracks described above. It is especially preferred to prefire the powders at about 750° C. because it imparts adequate strength without inducing significant shrinkage in length and width. These temperatures are typically maintained at atmospheric pressures for about 5 minutes to about 20 minutes in a conventional belt furnace.

Once prefired, the powders retain their shape and can be removed from the mold and sintered at the higher temperatures that are necessary to alloy the above-described powders. Thus, the electrode is cooled, removed from the mold and sintered at a temperature of about 1050° C. to about 1450° C. These higher temperatures alloy the materials resulting in significant shrinkage (e.g. an additional 17% to 22%) and yet since the electrode is not confined in the mold, it is permitted to shrink freely in all directions, including the direction perpendicular to the ribs and thus remains free from stress cracks. This sintering step is accomplished in a reducing atmosphere so that the powders are not oxidized. Again, a 10% hydrogen 90% nitrogen combination is acceptable. Below about 1050° C., the temperature is not high enough to alloy the (e.g. nickel-chromium) compound. Above about 1450° C., nickel melts forming a solid mass which is not suitable as an electrode. It is especially preferred to sinter the electrode at a temperature of about 1050° C. to about 1200° C. as this provides a good alloy yet the temperatures are not high enough to shrink the electrode to a point where the porosity is lower than that desired. Typically, the desired porosity is about 50% to about 70% because this range results in a pore size distribution desirable for good electrochemical performance in the cell. The sintering is accomplished typically at atmospheric pressures over a time period of about 5 minutes to about 20 minutes using a conventional belt furnace.

The molten carbonate anode can then be optionally compacted to achieve the desired final thickness, (e.g. 1.5 mm to about 1.8 mm). Of course, the thickness of the electrode depends upon its final desired application. The chromium can then be internally oxidized as described below resulting in creep resistance.

The finished electrodes can be fabricated in sizes of several square centimeters to several square meters and have thicknesses of about 0.25 mm to about 5 mm. The larger the electrode, the more advantageous this invention is since the stresses caused by shrinkage are more likely to cause fractures and imperfections in a larger electrode. Porosities are typically in a range of about 50% to about 59%. The channels are typically about 1 mm deep, 1.3 mm wide and the ribs are typically 1.3 mm wide. The size, porosity and dimensional parameters can be varied to match the demands of the particular application.

The electrode can then be incorporated into a conventional molten carbonate fuel cell. These cells are run in conventional fashions such as is known to those skilled in the art and described above in the Background Art section. Although this invention has been directed to molten carbonate anodes, specifically ribbed anodes, those skilled in the art will realize that it may be used to advantage for a variety of other applications such as molten carbonate cathodes, substrates, and electrolyte reservoirs, and may be used in a variety of fuel cells such as phosphoric acid or solid electrolyte fuel cells.

EXAMPLE

Powdered nickel (3000 grams) was mixed with powdered chromium (61 grams) in a blender for 15 minutes. The powder was then sifted through a 100 mesh screen onto a ribbed graphite mold (57 centimeters (cm) × 121 cm). Excess powder was struck off with a round bar resting on shims which produce a powder height in the rib area of 3.5 mm. The mold and powder were passed through a belt furnace at 750° C. in a 10% hydrogen to 90% nitrogen atmosphere for 15 minutes. The mold and ribbed electrode were allowed to cool and the ribbed electrode was removed from the mold. The electrode was then placed flat side down on a flat graphite plate treated with a release agent (graphite emulsion) to reduce drag forces and promote uniform shrinkage. It was then heated to 1065° C. for 15 minutes in a 10% hydrogen to 90% nitrogen atmosphere. The electrode was then roll compacted to a thickness of 1.6 mm. The chromium was then internally oxidized by heating the electrode in a retort (oven) to 750° C. in a 3% hydrogen and 97% nitrogen atmosphere. Upon attaining 750° C., steam was introduced providing a water to hydrogen ratio of 90 to 1 (by volume). The electrode was held at those conditions for 24 hours and then cooled to room temperature in an atmosphere of 3% hydrogen and 97% nitrogen. Although significant shrinkage occurred during the processing the electrode remained structurally sound. The ribbed electrode was about 45 cm by about 90 cm and about 1.6 mm thick. Its porosity was about 55% and had ribs that were 1.3 mm wide and channels that were 1.3 mm wide and 1.0 mm deep.

This invention facilitates the use of ribbed electrodes in the fuel cell industry by providing methods of fabrication that result in high strength electrodes. This process accommodates the substantial amount of shrinkage which occurs during thermal processing and so reduces the cracks that can occur as a result of the confining stresses of a mold. As such, it provides a viable alternative to machining the grooves which can be slow, wasteful and result in less quality electrodes. Thus, it provides a significant advance to the fuel cell industry.

It should be understood that the invention is not limited to the particular embodiment shown and described herein, but that various changes and modifications may be made without departing from the spirit or scope of this concept as defined by the following claims.

We claim:

1. A method of fabricating a ribbed electrode comprising:
   (a) depositing a composition comprising a metal selected from the group consisting of nickel, copper and mixtures thereof with chromium onto a ribbed mold;
   (b) prefiring said composition and ribbed mold in a reducing atmosphere to form a ribbed electrode;
   (c) removing said molded ribbed electrode from said mold; and
   (d) sintering said molded ribbed electrode in a reducing atmosphere; whereby said ribbed electrode has greater strength.

2. The method as recited in claim 1 wherein chromium is present in an amount about 0.5% to about 5%.

3. The method as recited in claim 1 wherein the composition is prefired at a temperature of about 650° C. to about 900° C.

4. The method as recited in claim 1 wherein the ribbed electrode is sintered at a temperature of about 1050° C. to about 1450° C.

* * * * *